US012665717B2

(12) United States Patent
Zhang et al.

(10) Patent No.: US 12,665,717 B2
(45) Date of Patent: Jun. 23, 2026

(54) SYSTEM AND METHOD FOR REFERENCE SIGNALING DESIGN AND CONFIGURATION

(71) Applicant: ZTE CORPORATION, Shenzhen (CN)

(72) Inventors: Shujuan Zhang, Shenzhen (CN); Bo Gao, Shenzhen (CN); Ke Yao, Shenzhen (CN); Shijia Shao, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 266 days.

(21) Appl. No.: 18/207,188

(22) Filed: Jun. 8, 2023

(65) Prior Publication Data

US 2023/0412339 A1     Dec. 21, 2023

Related U.S. Application Data

(63) Continuation of application No. PCT/CN2021/093098, filed on May 11, 2021.

(51) Int. Cl.
| | |
|---|---|
| *H04L 5/00* | (2006.01) |
| *H04B 17/318* | (2015.01) |
| *H04W 24/08* | (2009.01) |
| *H04W 72/23* | (2023.01) |

(52) U.S. Cl.
CPC ......... *H04L 5/0051* (2013.01); *H04B 17/328* (2023.05); *H04W 24/08* (2013.01); *H04W 72/23* (2023.01)

(58) Field of Classification Search
CPC .... H04L 5/0051; H04W 72/23; H04W 24/08; H04B 17/328
See application file for complete search history.

(56) References Cited

U.S. PATENT DOCUMENTS

| | | |
|---|---|---|
| 2019/0058517 A1 | 2/2019 | Kang et al. |
| 2019/0090150 A1 | 3/2019 | Axen et al. |
| 2020/0044802 A1 | 2/2020 | Park et al. |
| 2020/0412506 A1 | 12/2020 | Määttanen et al. |
| 2022/0046458 A1* | 2/2022 | Zhu ........................ H04W 24/10 |

(Continued)

FOREIGN PATENT DOCUMENTS

| | | |
|---|---|---|
| CN | 110958636 A | 4/2020 |
| WO | WO-2020/063457 A1 | 4/2020 |

OTHER PUBLICATIONS

CATT, "Enhancements on multi-beam operation", 3GPP TSG RAN WG1 #105-e. R1-2104484. May 27, 2021 e-Meeting. 12 pages.

(Continued)

*Primary Examiner* — Ronald B Abelson
(74) *Attorney, Agent, or Firm* — Foley & Lardner LLP

(57)     ABSTRACT

Example implementations include a wireless communication method of selecting, by a wireless communication device, N resources, where N is equal to or larger than 1; and sending, by the wireless communication device to a wireless communication node, a message including a Channel State Information (CSI) report, where the CSI report includes an index of each of the N resources, and quality information of each of the N resources, where each of the N resources includes a reference signal resource, and where each of the N resources corresponds to one of M elements, M being smaller than or equal to N.

19 Claims, 10 Drawing Sheets

(56)                    References Cited

U.S. PATENT DOCUMENTS

2022/0095361 A1*   3/2022   Saggar ................. H04W 72/23
2022/0345195 A1*   10/2022  Jang .................... H04B 7/0695

OTHER PUBLICATIONS

Ericsson. Enhancements on Multi-beam Operation, 3GPP TSG-RAN WG1 Meeting #105-e, R1-2105828, May 27, 2021 e-Meeting. 31 pages.
Mediatek Inc., "Enhancement on multi-beam operation", 3GPP TSG RAN WG1 #105-e, R1-2105353, May 27, 2021 e-Meeting. 28 pages.
Moderator (Intel Corporation), "Summary #2 of email discussion on initial access aspects of NR extension up to 71 GHz", 3GPP TSG RAN WG1 Meeting #105-e, R1-2106082, May 27, 2021, e-Meeting (231 Pages).
Moderator (Intel Corporation), "Summary #3 of email discussion on initial access aspects of NR extension up to 71 GHz", 3GPP TSG RAN WG1 Meeting #105-e, R1-2106311, May 27, 2021, e-Meeting (246 pages).
Nokia, Nokia Shanghai Bell, "Enhancements on Multi-beam Operation", 3GPP TSG RAN WG1 #105-e, R1-2105273, May 27, 2021 e-Meeting. 48 pages.
NTT DOCOMO, Inc. "Discussion on multi-beam operation" Agenda Item 8.1.1 Document for: Discussion and Decision. 3GPP TSG RAN WG1 #104bis-e. R1-2103559 Apr. 20, 2021, e-Meeting. 20 pages.
OPPO, "Enhancements on Multi-Beam Operation" Agenda 8.1.1 Document for Discussion and Decision, 3GPP TSG RAN WG1 #104b-e. R1-2102378. Apr. 20, 2021 e-Meeting. 20 pages.
QUALCOMM Incorporated "Enhancements of Multi-beam Operation", 3GPP TSG RAN WG1 Meeting #104-e. R1-2101446, Feb. 5, 2020. 15 pages.

VIVO. "Further discussion on multi beam enhancement". Agenda Item: 8.1.1 Document for: Discussion and Decision. 3GPP TSG RAN WG1 #105-e. R1-2104343. May 27, 2021, e-Meeting. 33 pages.
XIAOMI. "Enhancements on multi-beam operation". Documents for: Discussion and Decision. 3GPP TSG RAN WG1 #104b-e. R1-2102959. Apr. 20, 2021 e-Meeting. 12 pages.
ZTE. "Enhancements on Multi-beam Operation". 3GPP TSG RAN WG1 Meeting #105-e. R1-2104585. May 27, 2021 e-Meeting. 24 pages.
International Search Report and Written Opinion for PCT Appl. No. PCT/CN2021/093098, mailed Nov. 19, 2021 (11 pages).
ZTE et al., "On RS and CSI report settings" 3GPP TSG RAN WG1 NR Ad-Hoc Meeting, R1-1700128, Jan. 20, 2017, Spokane, USA (6 pages).
Extended European Search Report for EP Appl. No. 21941268.1, dated Jul. 3, 2024 (11 pages).
Moderator (Samsung), "Moderator summary for multi-beam enhancement", 3GPP TSG RAN WG1 #104b-e, R1-2103220, Apr. 20, 2021, e-Meeting (46 pages).
Moderator (Samsung), "Moderator summary#5 for multi-beam enhancement: Round 4", 3GPP TSG RAN WG1 #104b-e, R1-2103953, Apr. 20, 2021, e-Meeting (22 pages).
ZTE, "Enhancements on Multi-beam Operation," 3GPP TSG RAN WG1 Meeting #104b-e, R1-2102660, Apr. 20, 2021, e-Meeting (25 pages).
CATT, "Discussions on enhancements on multi-beam operation", 3GPP TSG RAN WG1 #104b-e, R1-2102598, Apr. 20, 2021, e-Meeting (16 pages).
Foreign Action on Korean Appl. No. 101160507 dated Oct. 20, 2025 (8 pages, with English translation).

* cited by examiner

300

| CSI Report | CSI Fields | |
|---|---|---|
| | Index of Selected Subset 1 (Such As 0) | 310 |
| | SSB-RI or CRI 1 in Subset 1 (Such as 0) | 320 |
| | SSB-RI or CRI 2 in Subset 1 (Such as 1) | 322 |
| | Index of Selected Subset 2 (Such as 2) | 312 |
| | SSB-RI or CRI 1 in Subset 2 (Such as 0) | 324 |
| | SSB-RI or CRI 2 in Subset 2 (Such as 2) | 326 |
| | RSRP of CRI 1 in Subset 1 | 330 |
| | Difference RSRP of CRI 2 in Subset 1 | 340 |
| | RSRP of CRI 1 in Subset 2 | 332 |
| | Difference RSRP of CRI 2 in Subset 2 | 342 |

FIG. 3

| CSI Report | CSI Fields | |
|---|---|---|
| | Index of Selected Subset 1 (Such As 0) | 310 |
| | SSB-RI or CRI 1 in Subset 1 (Such as 0) | 320 |
| | SSB-RI or CRI 2 in Subset 1 (Such as 1) | 322 |
| | Index of Selected Subset 2 (Such as 2) | 312 |
| | SSB-RI or CRI 1 in Subset 2 (Such as 0) | 324 |
| | SSB-RI or CRI 2 in Subset 2 (Such as 2) | 326 |
| | RSRP of CRI 1 in Subset 1 | 330 |
| | Difference RSRP of CRI 2 in Subset 1 | 340 |
| | Difference RSRP of CRI 1 in Subset 2 | 410 |
| | Difference RSRP of CRI 2 in Subset 2 | 342 |

| CSI Fields | |
|---|---|
| SSB-RI or CRI 1 in Set (Such as 0) | 510 |
| SSB-RI or CRI 2 in Set (Such as 1) | 512 |
| B-RI of CRI 3 in Set (Such as 3) | 520 |
| SSB-RI or CRI 4 in Set (Such as 8) | 514 |
| SSB-RI or CRI 5 in Set (Such as 10) | 516 |
| RSRP of SSB-RI or CRI 1 | 530 |
| Difference RSRP of SSB-RI or CRI 2 | 540 |
| Difference RSRP of SSB-RI or CRI 3 | 542 |
| RSRP of SSB-RI or CRI 4 | 532 |
| Difference RSRP of CRI 5 | 544 |

CSI Report

Figure 6:
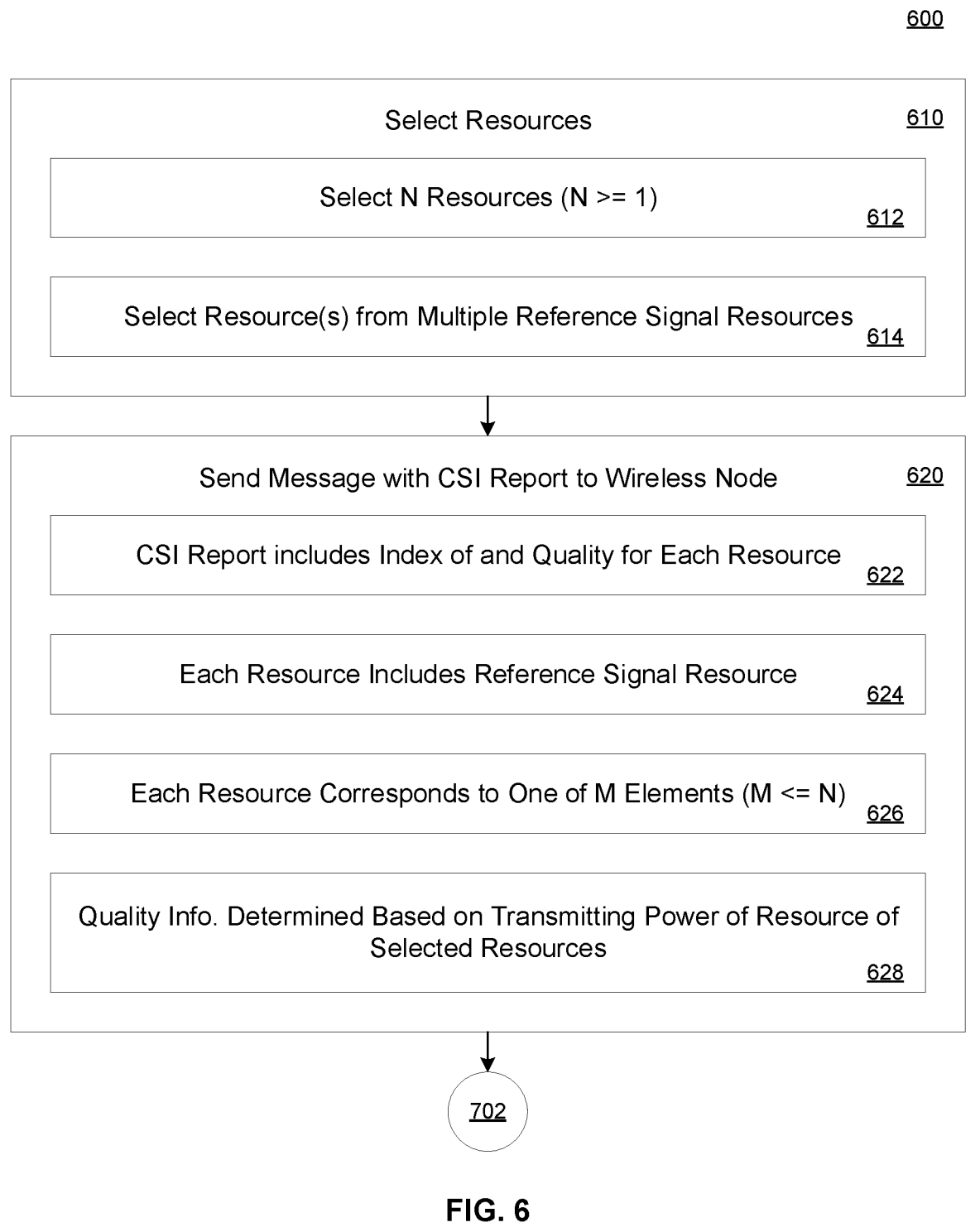

Select Resources                                                    610

Select N Resources (N >= 1)
                                                                    612

Select Resource(s) from Multiple Reference Signal Resources
                                                                    614

Send Message with CSI Report to Wireless Node          620

CSI Report includes Index of and Quality for Each Resource
                                                                    622

Each Resource Includes Reference Signal Resource
                                                                    624

Each Resource Corresponds to One of M Elements (M <= N)
                                                                    626

Quality Info. Determined Based on Transmitting Power of Resource of
Selected Resources
                                                                    628

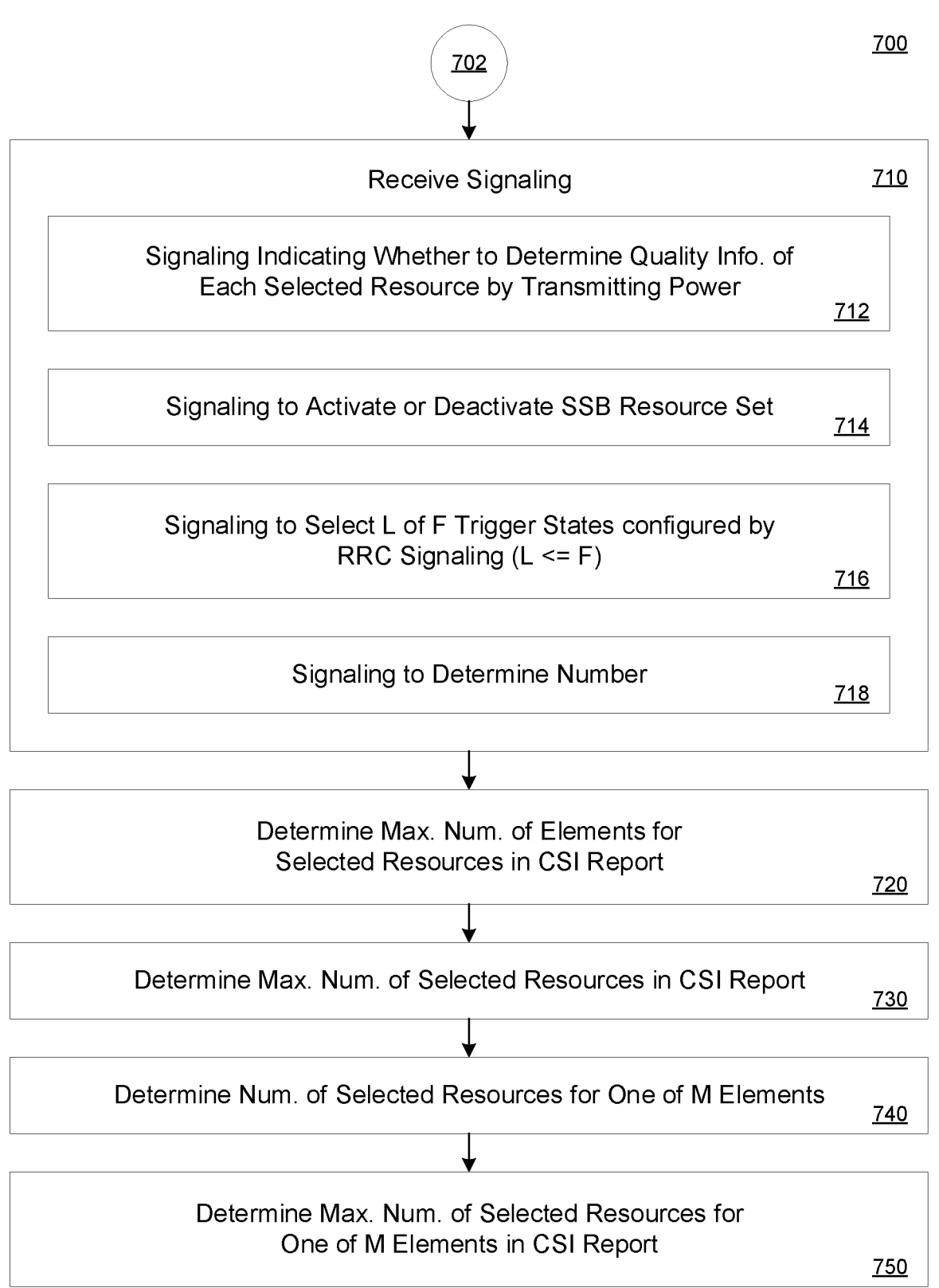

700

702

Receive Signaling 710

Signaling Indicating Whether to Determine Quality Info. of Each Selected Resource by Transmitting Power

712

Signaling to Activate or Deactivate SSB Resource Set

714

Signaling to Select L of F Trigger States configured by RRC Signaling (L <= F)

716

Signaling to Determine Number

718

Determine Max. Num. of Elements for Selected Resources in CSI Report

720

Determine Max. Num. of Selected Resources in CSI Report

730

Determine Num. of Selected Resources for One of M Elements

740

Determine Max. Num. of Selected Resources for One of M Elements in CSI Report

Select N Resources (N>= 1)     610

Send Message to Wireless Node with CSI Report     620

CSI Report includes Index of and Quality for Each Resource     622

Each Resource Includes Reference Signal Resource     624

Each Resource Corresponds to One of M Elements (M <= N)     626

1000

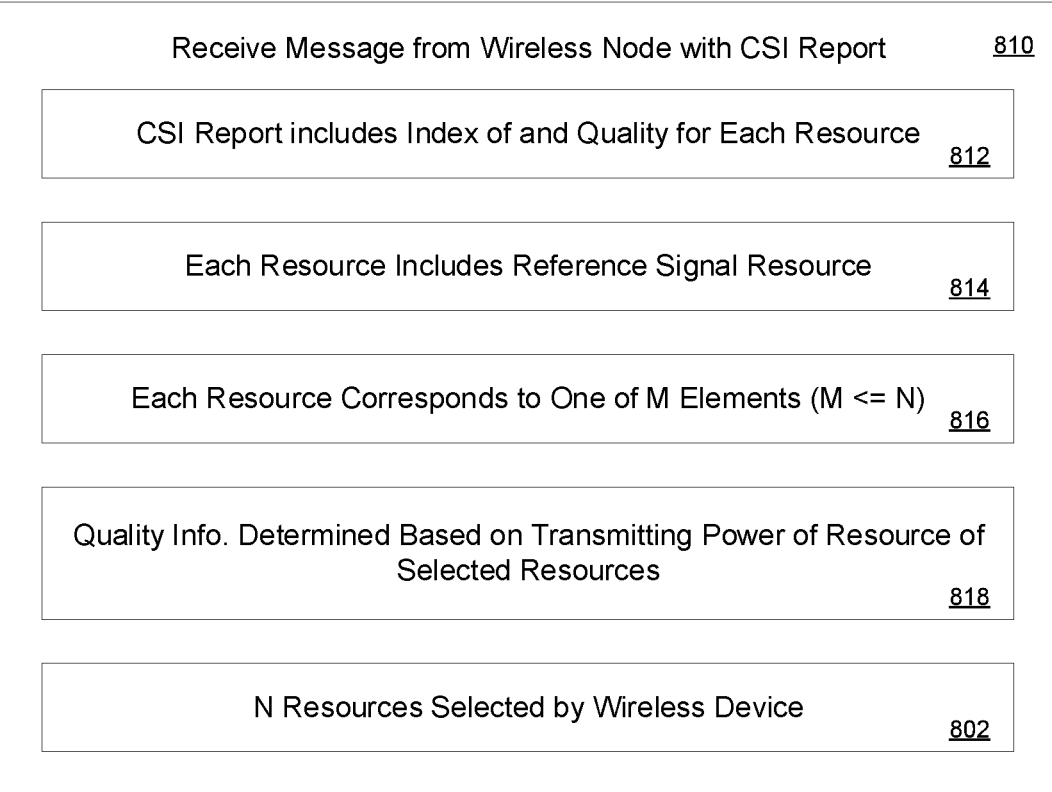

Receive Message from Wireless Node with CSI Report     810

CSI Report includes Index of and Quality for Each Resource     812

Each Resource Includes Reference Signal Resource     814

Each Resource Corresponds to One of M Elements (M <= N)     816

Quality Info. Determined Based on Transmitting Power of Resource of Selected Resources     818

N Resources Selected by Wireless Device     802

Send Signaling     820

Signaling to Activate or Deactivate SSB Resource Set     822

Signaling to Select L of F Trigger States configured by RRC Signaling (L <= F)     824

Signaling Includes MAC-CE Element or First DCI     826

SYSTEM AND METHOD FOR REFERENCE SIGNALING DESIGN AND CONFIGURATION

CROSS-REFERENCE TO RELATED APPLICATION

This application claims the benefit of priority under 35 U.S.C. § 120 as a continuation of International Patent Application No. PCT/CN2021/093098, filed on May 11, 2021, the disclosure of which is incorporated herein by reference in its entirety.

TECHNICAL FIELD

The present implementations relate generally to wireless communications, and more particularly to reference signaling design and configuration.

BACKGROUND

Beam switching between beams of different cells is slow as it involves switching of a serving cell. Thus, it is desirable to speed up beam switching beams of different cells.

SUMMARY

Example implementations can report a beam from different cells. Example implementations can also reduce the complexity of UE to measure different cells. Thus, a technological solution for reference signaling design and configuration is desired.

Example implementations include a wireless communication method of selecting, by a wireless communication device, N resources, where N is equal to or larger than 1; and sending, by the wireless communication device to a wireless communication node, a message including a Channel State Information (CSI) report, where the CSI report includes an index of each of the N resources, and quality information of each of the N resources, where each of the N resources includes a reference signal resource, and where each of the N resources corresponds to one of M elements, M being smaller than or equal to N.

Example implementations also include a method where the index of each of the N resources is a relative index of a corresponding resource among resources that correspond to one of the M elements.

Example implementations also include a method where the quality information of a first resource of each of the M elements is an absolute quality value, and the quality information of each remaining resource of the corresponding element is a difference quality value with respect to the absolute quality value of the first resource.

Example implementations also include a method where the quality information of a first resource of the N resources is an absolute quality value, and the quality information of each of remaining ones of the N resources is a difference quality value with respect to the absolute quality value of the first resource.

Example implementations also include a method where the step of selecting the N resources includes selecting the M elements from multiple elements, and selecting resources for each of the M elements.

Example implementations also include a method where N is an integer multiple of M Example implementations also include a method where the N resources include a same number of resources from each of the M elements.

Example implementations also include a method of further, according to received signaling or a rule, at least one of: M, a maximum number of elements corresponding to selected resources in one CSI report, N, a maximum number of selected resources in one CSI report, a number of selected resources for one of the M elements, or a maximum number of selected resources for one of the M elements in one CSI report.

Example implementations also include a method where the signaling or the rule indicates that in response to determining the maximum number of selected resources for one element of the M elements, the index of each of the N resources is an index of corresponding resource among resources over multiple elements, where the N resources are selected from resources correspond to the multiple elements, or in response to determining the number of selected resources for one element in one CSI report the index of each the N resources is an relative index of corresponding resource among resources corresponding to one of the M elements.

Example implementations also include a method where the CSI report includes information of each of the M elements.

Example implementations also include a method where the information of each of the M elements includes at least one of: an index of each of the M elements or an average quality of each of the M elements, where the average quality includes an average quality of one or more best resources of the corresponding element.

Example implementations also include a method where each of the M elements includes at least one of: a PCI, a MeasObject, frequency information of the SSB, time domain information of the SSB, a transmitting power, a half frame index of the SSB, time domain pattern information of the SSB, or a periodicity.

Example implementations also include a method where each of the M elements includes a resource subset, where the N resources are selected from one set which includes one or more subsets.

Example implementations also include a method where each of the M elements includes a resource set, where the N resources are selected from one or more resource set Example implementations also include a method where each of the M elements includes a setting, where the N resources are selected from one or more settings.

Example implementations also include a method where the quality information includes at least one of: a Reference Signal Received Power (quality), a Signal to Noise and Interference Ratio (SINR).

Example implementations also include a method where the quality information of each of the N resources is based on transmitting power of the corresponding resource and each of the M elements is associated with a configuration of the transmitting power.

Example implementations also include a wireless communication method of selecting, a wireless communication device, one or more resources from a plurality of reference signal resources, and sending, by the wireless communication device to a wireless communication node, a message including a Channel State Information (CSI) report, where the CSI report includes quality information of each of the selected resources that is determined based on a transmitting power of a corresponding resource of the selected resources.

Example implementations also include a method where the quality information of each selected resource is determined according to a difference between a receiving quality value of the selected resource and the transmitting power of the selected resource.

Example implementations also include a method of further receiving, by wireless communication device from the wireless communication node, a signaling indicating whether to determine the quality information of each of the selected resources based on the transmitting power.

Example implementations also include a method where the plurality of reference signal resources correspond to multiple sets, and where each of the multiple sets is associated with one configuration of the transmitting power.

Example implementations also include a method where the quality information includes at least one of: a Reference Signal Received Power (RSRP), or a Signal to Noise and Interference ratio (SINR).

Example implementations also include a wireless communication method of receiving, by a wireless communication device from a wireless communication node, a signaling that activates or deactivates an SSB resource set, and/or selects L trigger states from F trigger states configured by RRC signaling, where L is smaller than or equal to F, where the signaling includes a Medium Access Control-Control Element (MAC-CE) or a first DCI.

Example implementations also include a method further including at least one of: measuring, by the wireless communication device, SSB resources in the SSB resource set if the SSB resource set is activated, or is associated with at least one of the L trigger states, calculating, by the wireless communication device, a number of SSB resources to measure an RSRP or SINR according to the SSB resource set if the SSB resource set is activated, or is associated with at least one of the L trigger states, not measuring, by the wireless communication device, SSB resources in the SSB resource set in case that the SSB resource set is not activated and it is configured by the RRC signaling, or the SSB resource set is not associated with any of the L trigger states, or not measuring, by the wireless communication device, SSB resources in the SSB resource set that is deactivated.

Example implementations also include a method further including at least one of: measuring, by the wireless communication device, an SSB resource in the SSB resource set during a predefined number of transmission occasions of the SSB resource after the SSB resource set is activated, or is associated with at least one trigger state of the L trigger states, or measuring, by the wireless communication device, an SSB resource in the SSB resource set during a predefined number of transmission occasions of the SSB resource after a second DCI which includes a codepoint mapped to a trigger state associated with the SSB resource set.

Example implementations also include a method where a subheader of the MAC-CE is the same as a subheader of a MAC-CE that actives or deactivate a Channel State Information-Reference Signal (CSI-RS) resource set.

Example implementations also include a method where the MAC-CE includes information for indicating a type of set that it activates or deactivate, where the type of set includes a CSI-RS resource set and the SSB resource set.

Example implementations also include a method where the MAC-CE includes a TCI state for each CSI-RS resource in a CSI-RS resource set, when the MAC-CE activate the CSI-RS resource set.

Example implementations also include a method where if the MAC CE activate the SSB resource set, the MAC-CE includes one piece of SSB information for each SSB resource of the SSB resource set, or the MAC-CE includes one piece of SSB information for the SSB resource set.

Example implementations also include a method where the MAC-CE includes one piece of SSB information for each of SSB resources in the SSB resource set, or the MAC-CE includes one piece of SSB information for the SSB resource set, when the signaling activates the SSB resource set.

Example implementations also include a method where at least one of the L trigger state is associated an SSB set of a type.

Example implementations also include a method where the signaling selects the L trigger states from the F trigger states when the F is larger than $2^{N_{TS}}-1$ and a first condition is satisfied, where $N_{TS}$ is a number of bits in an CSI request field in a second DCI.

Example implementations also include a method where the first condition includes at least one of: none of the F trigger state is associated with an SSB set of a type, a first mode is enable, a serving cell is configured with only one pieces of SSB information, or none of neighboring cell is configured, no dedicated piece of SSB information is configured, no dedicated piece of SSB information is configured for a serving cell, only cell specific piece of SSB information is configured, only cell specific piece of SSB information is configured for a serving cell.

Example implementations also include a method where the signaling selects the L trigger states from the F trigger states when a second condition is satisfied.

Example implementations also include a method where the second condition includes at least one of: at least one of the F trigger state is associated with a SSB set of a type, a second mode is enabled, a serving cell is configured with more than one pieces of SSB information, or at least one of neighboring cell is configured, at least one of dedicated piece of SSB information is configured, and, at least one of dedicated piece of SSB information is configured for a serving cell.

Example implementations also include a method where the signaling selects the L trigger states from the F trigger states regardless of a relationship between the F and $2^{N_{TS}}-1$, where $N_{TS}$ is a number of bits in an CSI request field in a second DCI.

Example implementations also include a method further including at least one of: receiving a RRC signaling which includes a resource type of an SSB resource, where the resource type is one of aperiodic, semi-persistent, or periodic, receiving a RRC signaling which indicate whether an SSB resource set can be activated/deactivated by the signaling, receiving a RRC signaling which indicate whether each SSB resource of an SSB resource set can be associated with one piece of SSB information in a trigger state or in the signaling, receiving a RRC signaling which indicate whether an SSB resource set can be associated with one piece of SSB information in a trigger state or in the signaling, receiving a RRC signaling which indicate whether each SSB resource of an SSB resource set can be associated with one dedicated piece of SSB information in a trigger state or in the signaling, or receiving a RRC signaling which indicate whether an SSB resource set can be associated with one dedicated piece of SSB information in a trigger state or in the signaling, Example implementations also include a method where L is smaller than or equals to $2^{N_{TS}}-1$ where $N_{TS}$ is a number of bits in an CSI request field in a second DCI.

Example implementations also include a method where the L selected trigger states are in order mapped to L codepoints of CSI request filed of a second DCI starting from codepoint 1, and where the F trigger states are associated with one serving cell or one BWP.

Example implementations also include a method where an SSB resource in the SSB resource set is associated with one of a PCI of a neighboring cell, or one dedicated piece of SSB information.

Example implementations also include a method where an SSB resource of the SSB resource set is associated with a PCI that is not with one of a PCI of a serving cell, or one cell specific piece of SSB information.

Example implementations also include a method further including at least one of: configuring an SSB resource of an serving cell only to be periodic, configuring an SSB resource of the neighboring cell as being one of: aperiodic, semi-persistent, or periodic, configuring an SSB resource associated with an cell specific piece of SSB information only to be periodic, or configuring an SSB resource associated with an dedicated piece of SSB information as being one of: aperiodic, semi-persistent, or periodic.

Example implementations also include a method where an trigger state of the F trigger state includes one pieces of SSB information for each SSB resource of the SSB resource set, or the trigger state includes one pieces of SSB information for the SSB resource set.

Example implementations also include a method where the trigger state of the F trigger state is associated with an SSB resource set of a type, Example implementations also include a method where the SSB set of the type includes one of an SSB set which is non periodic SSB set, an aperiodic SSB set, an SSB set of neighboring cell, an SSB set associated with an dedicated piece of SSB information, or an SSB set with a predefined indication which indicates that the SSB set can be activated by the signaling, or indicates that each SSB resource of the SSB set can be associated with one piece of SSB information in the signaling or in a trigger state.

Example implementations also include a method where the SSB resource set is associated with an periodicity and without periodic offset.

where when the SSB resource set is associated with a trigger state of the L trigger state and the SSB set is associated with one piece of SSB information.

Example implementations also include a method where the piece of SSB information includes at least one of: a PCI, a MeasObject, frequency information of the SSB, SSB block selection in one SSB burst, a transmitting power, a half frame index of the SSB, time domain pattern Case information of the SSB, a periodicity, cell information, cell specific SSB information, or dedicated SSB information.

Example implementations also include a wireless communication method of receiving, by a wireless communication node to from a wireless communication device, a message including a Channel State Information (CSI) report, where the CSI report includes an index of each of the N resources, and quality information of each of the N resources, where each of the N resources includes a reference signal resource, where each of the N resources corresponds to one of M elements, M being smaller than or equal to N, where the N resources are selected by a wireless communication device, and where N is equal to or larger than 1.

Example implementations also include a wireless communication method of receiving, by a wireless communication node from a wireless communication device, a message including a Channel State Information (CSI) report, where the CSI report includes quality information of each of the selected resources that is determined based on a transmitting power of a corresponding resource of the selected resources, and where the one or more resources are selected from a plurality of reference signal resources.

Example implementations also include a wireless communication method of sending, by a wireless communication node to a wireless communication device, a signaling that activates or deactivates an SSB resource set, and/or selects L trigger states from F trigger states configured by RRC signaling, wherein L is smaller than or equal to F, where the signaling includes a Medium Access Control-Control Element (MAC-CE) or a first DCI.

BRIEF DESCRIPTION OF THE DRAWINGS

These and other aspects and features of the present implementations will become apparent to those ordinarily skilled in the art upon review of the following description of specific implementations in conjunction with the accompanying figures, wherein:

FIG. 3 illustrates an example a first example CSI report including a plurality of CSI fields, in accordance with present implementations.

FIG. 4 illustrates a second example CSI report including a plurality of CSI fields, in accordance with present implementations.

FIG. 5 illustrates a third example CSI report including a plurality of CSI fields, in accordance with present implementations.

FIG. 6 illustrates a first example method of reference signaling design and configuration by a wireless communication device, in accordance with present implementations.

FIG. 7 illustrates an example method of reference signaling design and configuration by a wireless communication device further to the example method of FIG. 6.

FIG. 10 illustrates a second example method of reference signaling design and configuration by a wireless communication node, in accordance with present implementations.

FIG. 11 illustrates a third example method of reference signaling design and configuration by a wireless communication node, in accordance with present implementations.

DETAILED DESCRIPTION

Figure 1:
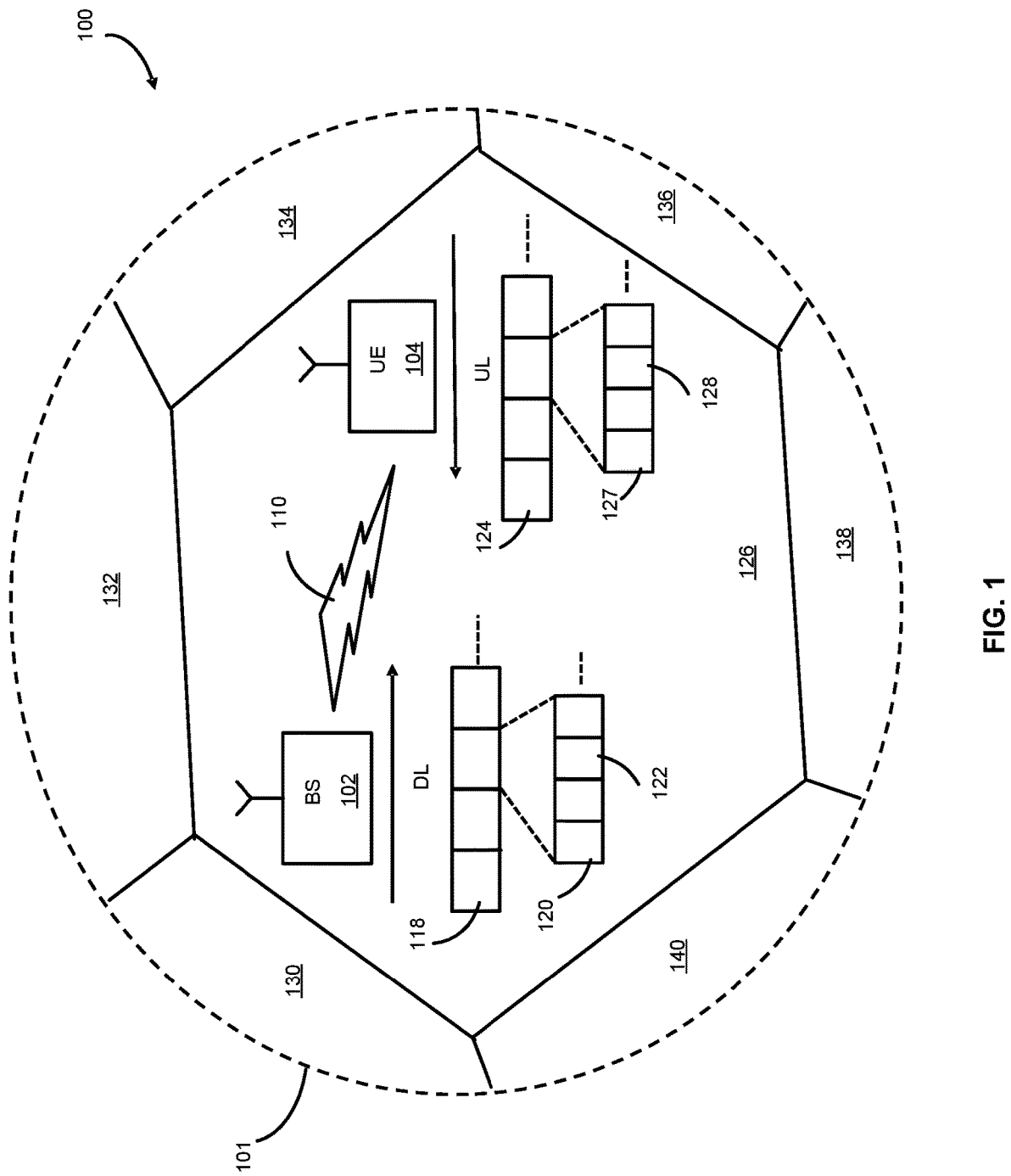
FIG. 1 illustrates an example cellular communication network in which techniques and other aspects disclosed herein may be implemented, in accordance with an implementation of the present disclosure.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

In some implementations, one piece of SSB information includes at least one of a physical cell index (PCI), MeasObject, frequency information of the SSB, time domain information of the SSB, transmitting power, half frame index of the SSB, time domain pattern information of the SSB, periodicity. In some implementations, the PCI is used to get the sequence of the SSB or get QCL-RS of the CSI-RS. In some implementations, the MeasObject is used to get a carrier of the SSB, Sub-carrier space of the SSB, or the PCI list of the SSB. In some implementations, the frequency information of the SSB corresponds to a carrier of the SSB or ARFCN-ValueNR of the SSB. In some implementations, the time domain information of the SSB corresponds to slot, slot offset, or SSB block selection information in a burst. In some implementations, time domain pattern information of the SSB corresponds to Case information, where the Case includes at least one of Case A through Case D. The piece of SSB information can be cell specific or dedicated. If it is dedicated, the piece of SSB information is configured as dedicated parameter and in a dedicated signaling. The dedicated piece of SSB information also can be named as UE-Specific signaling. The cell-specific piece of SSB information is configured as cell specific parameter and in common signaling.

The one piece of SSB information can also be named as cell information, or other name. In some implements, a gNB configures multiple pieces of SSB information. Each of piece of SSB information corresponds to a neighboring cell/cell. When the gNB configures the UE with one pieces of SSB information for a SSB resource or SSB resource set, the gNB only configures the index of the corresponding piece of SSB information among the multiple pieces of the SSB information. Alternatively, if the piece of SSB information isn't configured for an SSB resource or an SSB resource set, the piece of SSB information for the an SSB resource or an SSB resource set is the cell specific piece of SSB information.

FIG. 1 illustrates an example wireless communication network, and/or system, 100 in which techniques disclosed herein may be implemented, in accordance with an implementation of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various implementations of the present solution.

Figure 2:
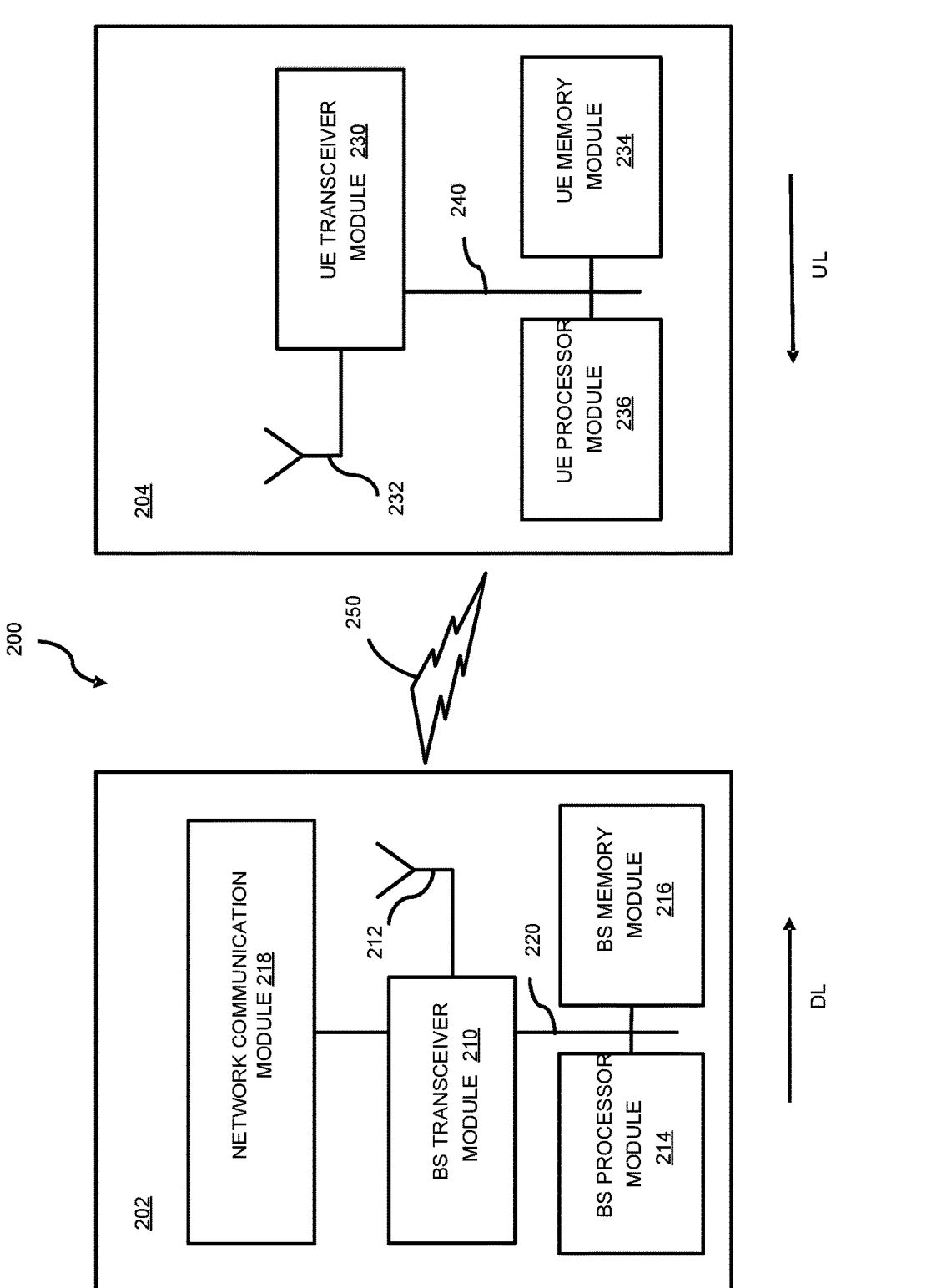
FIG. 2 illustrates block diagrams of an example base station and a user equipment device, in accordance with some implementations of the present disclosure.

FIG. 2 illustrates a block diagram of an example wireless communication system 200 for transmitting and receiving wireless communication signals, e.g., OFDM/OFDMA signals, in accordance with some implementations of the present solution. The system 200 may include components and elements configured to support known or conventional operating features that need not be described in detail herein. In one illustrative implementation, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the implementations disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some implementations, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some implementations, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some implementations, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative implementations, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various implementations, the BS 202 may be an evolved node B (eNB), a serving eNB, a target eNB, a femto station, or a pico station, for example. In some implementations, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the implementations disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some implementations, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

In some implementations, for a CSI-RS resource set, the UE is configured with multiple measurement resources, and each resource is associated with a physical cell index (PCI). As one example, multiple measurement resources can include at least one of a synchronization signal block (SSB) and a CSI-RS resource. In some implementations, the UE gets multiple resource subsets, each of which is associated with a same PCI. Further, in some implementations, the UE selects N resources among the set and reports PCI and at least one of a CSI-RS resource indicator SSB resource indicator (SSB-RI), wherein N is an positive integer. In some implementations, the CRI or SSB-RI is the index of the resource among the resources in a resource subset associated with a PCI. The UE reports selected PCI and CRI or SSB-RI. Alternatively, in some implementations, the UE reports subsets ID and CRI/SSB-RI.

FIG. 3 illustrates a first example CSI report including a plurality of CSI fields, in accordance with present implementations. As illustrated by way of example in FIG. 3, an example CSI report 300 includes CSI fields 310, 312, 320, 322, 324, 326, 330, 332, 340 and 342.

For example, the UE can be configured by gNB with a set which includes following resources {(SSB0, PCI0), (SSB1, PCI0), (SSB4, PCI0), (SSB8, PCI0), (SSB0, PCI1), (SSB3, PCI1), (SSB5, PCI1), (SSB9, PCI1), (SSB0, PCI2), (SSB2, PCI2), (SSB6, PCI2), (SSB11, PCI2)}. In this example, the set is divided to 3 subsets according to PCI associated with each SSB resource. Subset 1 includes resources of {(SSB0, PCI0), (SSB1, PCI0), (SSB4, PCI0), (SSB8, PCI0)}. Subset 2 includes resources of {(SSB0, PCI1), (SSB3, PCI1), (SSB5, PCI1), (SSB9, PCI1)}. Subset 3 includes resources of {(SSB0, PCI2), (SSB2, PCI2), (SSB6, PCI2), (SSB11, PCI2)}. In some implementations, if UE selects {(SSB0, PCI0), (SSB1, PCI0), (SSB0, PCI2), (SSB6, PCI2)}, then the UE reports to gNB with the index of subset1 and SSB-RI 0, SSB-RI1 in subset 1, and the index of subset3 and SSB-RI 0, SSB-RI3 in subset 3, as shown in FIG. 3.

FIG. 4 illustrates a second example CSI report including a plurality of CSI fields, in accordance with present implementations. As illustrated by way of example in FIG. 4, an example CSI report 400 includes CSI fields 310, 312, 320, 322, 324, 326, 330, 340, 342 and 410.

As shown by way of example in FIG. 3, the RSRP of SSB-RI #1 for each subset is reported using absolute. The RSRP of remaining resource for each subset is reported using differential RSRP with respect to the RSRP of SSB-RI #1 for the corresponding subset. In another implementation, only the RSRP of SSB-RI #1 is reported using absolute value, and the RSRP of remaining resources of the N selected resources are reported using a difference value, as shown by way of example in FIG. 4. For example, N resources correspond to one or more sets, and each set corresponds to one transmission power information. In some implementations, not every resource corresponds to one transmission power information. In some implementations, each of M elements corresponds to one or more resources of N resources.

In some implementations, the gNB configures the UE with the number of the subsets or PCIs reported by the UE. As shown by way of example in FIG. 3, the SSB-RI or CRI is a local index of the selected resource in a selected resource subset. In some implementations, the number of selected resources in a selected subset is same for all selected subset. For example, the number is predetermined or configured by gNB. As another example, the number of selected resources in a selected subset is 2 in FIG. 3. As another example, the RSRP of the SSB-RI or CRI #1 in each selected subset is reported using absolute value. As another example, the RSRP of the remaining SSB-RI or CRI in each selected subset is reported using differential value with respect to the absolute value.

FIG. 5 illustrates a third example CSI report including a plurality of CSI fields, in accordance with present implementations. As illustrated by way of example in FIG. 5, an example CSI report 500 includes CSI fields 510, 512, 514, 516, 520, 530, 532, 540, 542 and 544.

In some implementations, the gNB configures the UE with maximum number of the selected pieces of SSB information/subsets. The gNB configures the UE with the maximum number of the reported resources in one subset. Then the UE reports the number of selected subsets or pieces of SSB information, and/or the number of reported resources in each selected subset. Further, in some implementations, the UE directly reports the CRI/SSB-RI with absolute index among resources in the set as shown in FIG. 5. As one example, the RSRP of a first SSB-RI or CRI for each selected PCI is reported using absolute value, The RSRP of remain SSB-RI or CRI of each selected PCI is reported using difference value. The UE selects 3 resources for PCI 0 and selects 2 resources for PCI 2. It doesn't selects PCI 1. Alternatively, in some implementations, only the RSRP of the first SSB-RI or CRI is reported using absolute value, and the RSRP of remaining reported resource using difference value. In some implementations, the UE selects 5 resources from the resource set in FIG. 5, where the 5 resources are {(SSB0, PCI0), (SSB1, PCI0), (SSB8, PCI0), (SSB0, PCI2), (SSB6, PCI2)} from the resource set of {(SSB0, PCI0), (SSB1, PCI0), (SSB4, PCI0), (SSB8, PCI0), (SSB0, PCI1), (SSB3, PCI1), (SSB5, PCI1), (SSB9, PCI1), (SSB0, PCI2), (SSB2, PCI2), (SSB6, PCI2), (SSB11, PCI2)}. In some implementations, the PCI in above description can be replaced with one piece of SSB information.

In some implementation, the UE can also report an average RSRP for each PCI. The average RSRP for a PCI is an average RSRP of the best D resources of the PCI, where D is a positive integer. In some implementation the UE reports average L1-SINR for each PCI. As shown by way of example in FIG. 3, for CSI reporting, a set is configured with multiple resources which includes multiple subsets. As one example, each of the subsets is associated with one piece of SSB information respectively.

In some implementations, a CSI-Reporting is configured with multiple resource sets. As one example, each of the sets is associated with one piece of SSB information respectively. In some implementations, the UE reports the selected set index and resource index in the selected set as shown in FIG. 3~5, except by replacing the subset with set.

In some implementations, a CSI report is configured multiple resource settings for channel measurement. Each resource setting can be associated with one piece of SSB information respectively. Each of the multiple resource settings includes one or more resource sets. The UE can report the selected resource setting index and resource index in the selected resource setting as shown in FIG. 3~5, except by replacing the subset with a resource setting.

In some implementations, the UE can report the CSI report in uplink control information (UCI) included in PUCCH or PUSCH. The UE also can report the CSI report in a MAC-CE. In some implementation, the UE reports L1-SINR for each selected resource. In some implementation, the UE reports RSRP and L1-SINR for each selected resource.

In some implementations, the UE reports multiple SSB-RIs and multiple L1-RSRPs. In some implementations, the maximum L1-RSRP for each PCI is reported using an absolute value, and other L1-RSRPs of each PCI using a difference value which is offset between the L1-RSRP and the maximum L1-RSRP of the PCI. Each SSB-RI is associated with one PCI, and each PCI corresponds to one or more SSB-RI which is the index of an SSB resource.

In some implementations, the UE determines L1-RSRP at least partially based on considering transmitting power of a measurement reference signal resource. In some implementations, the measurement reference signal resource is at least one of SSB and CSI-RS. In some implementations, the UE reports the determined L1-RSPR. For example, the reported L1-RSPR can be determined according to difference between receiving RSRP and the transmitting power, such as it is the difference between receiving RSRP and the transmitting power, or it is difference between the transmitting power and receiving RSRP. For example, different measurements reference signal resources can be associated with different transmitting powers. The different measurements reference signal resources can be associated with different pieces of SSB information. Measurements reference signal resources of a same pieces of SSB information can be with same transmitting power. Measurements reference signal resources of different pieces of SSB information can be with different transmitting power.

In some implementation, the gNB configures whether the UE should take transmitting power of a measurement reference signal resource into account when the UE reports the L1-RSRP. In some implementations, if the gNB configures the UE to take the transmitting power of measurement reference signal resource into account when the UE reports the L1-RSRP, the reported L1-RSRP is a difference between received RSRP and the transmitting power. Alternatively, in some implementations, the reported L1-RSRP is or corresponds to the received RSRP of a measurement reference signal resource.

In some implementations, the gNB activates an SSB resource/resource set using a MAC-CE. In some implementations, the SSB is only measured only when it is activated. The periodicity of the SSB can be indicated using at least one of RRC and MAC-CE. The SSB can also be semi-persistent. The MAC-CE can be a same MAC-CE used to activate a CSI-RS resource set. In some implementations, the MAC-CE includes SP-CSI-SSB-set ID. The MAC-CE also can include one piece of SSB information for each SSB-Resource in the SP-CSI-SSB-set ID. In some implementations, the SSB resource/resource set corresponds to a neighboring cell SSB. In some implementations, the PCI of the SSB is not a PCI of a serving cell. In some implementations, the PCI of a serving cell is configured in common signaling of the serving cell. The one piece of SSB information of the SSB resource/resource set activated by the MAC-CE is a dedicate piece of SSB information and isn't cell specific piece of SSB resource set.

In some implementations, the gNB activates SSB resource/resource set using a MAC-CE/DCI. In some implementations, the SSB is only measured at only a number of transmission occasions of the SSB after the MAC-CE/DCI. The periodicity of the SSB resource/resource set can be indicated using at least one of RRC and MAC-CE. In some implementations, the SSB is a neighboring cell SSB. In some implementations, the PCI of the SSB is not a PCI of a serving cell. In some implementations, the PCI of a serving cell is configured in common signaling of the serving cell.

In some implementations, a maximum number of SSB/CSI-RS (1Tx) resources across all CCs and/or pieces of SSB information configured to measure L1-RSRP within a slot shall not exceed a first threshold which can be a UE capability reported by the UE. As one example, the maximum number of SSB/CSI-RS (1Tx) resources is a sum of aperiodic/periodic/semi-persistent numbers. In some implementations, the maximum number of SSB resources across all CCs and/or pieces of SSB information configured to measure L1-RSRP shall not exceed a second threshold. In some implementations, the max number of SSB resources across all CCs and/or pieces of SSB information to measure L1-RSRP within a slot shall not exceed a third threshold. The second threshold and the third threshold are UE capability which can be reported by the UE. In some implementations, the semi-persistent SSB of a neighboring cell only is taken into the above number only after it is activated by the MAC-CE. If the SSB resource of neighboring cell only is configured by a RRC signaling and is not activated by the MAC-CE, the SSB resource of neighboring cell will not be taken into the above number. The resource type of a SSB of a neighboring cell can be configured in a resource setting including the SSB. The resource type of a SSB includes at least one of aperiodic, semi-persistent, or periodic. In some implementation, the semi-persistent SSB also can be activated by a DCI.

In some implementations, the resource type of an SSB of a neighboring cell can be configured in a resource setting including the SSB. The resource type of an SSB includes at least one of aperiodic, semi-persistent, or periodic. In some implementations, the gNB signals the UE with an indication. The indication indicates one of: whether an SSB resource can be activated/deactivated by a MAC-CE/DCI, whether the gNB can inform one piece of SSB information for an SSB resource, whether the gNB can inform one piece of SSB information for each SSB resource in an SSB resource set using a MAC-CE/in an trigger state, whether at least one dedicated SSB information is configured, whether the SSB resource/resource set can be configured with one dedicated SSB information. The indication can be configured per SSB resource, per SSB resource set, or per SSB resource setting, or per serving cell. The SSB resource of an neighboring cell is an SSB resource with one dedicate piece of SSB information.

In some implementations, the SSB can only be measured by a UE for a predefined number of available transmission occasions of indicated SSB after DCI scheduling the SSB, which can be but is not limited to aperiodic SSB. In some implementations, the aperiodic SSB set is not associated with a time offset but is associated with one or more pieces of SSB information of a neighbor cell. In some implementations, the UE gets the first available transmission of SSB from neighbor cell according to the one or more pieces of SSB information. The piece of SSB information can be configured for each SSB resource in an SSB set in configuration of a trigger state. In some implementations, the TCI state of an aperiodic CSI-RS in an trigger state is replaced with one piece of SSB information of the SSB resource of an SSB resource set when the trigger state is associated with an SSB resource set of a type. In some implementations, the SSB resource of the type includes at least one of an SSB set which is a non-periodic SSB set; an aperiodic SSB set; an SSB set of neighboring cell; an SSB set associated with an dedicated piece of SSB information; an SSB set with a predefined indication which indicates that the SSB set can be activated by an MAC-CE/DCI, or indicates that each SSB resource of the SSB set can be associated with one piece of SSB information in the signaling or in a trigger state.

In some implementations, the UE measures the SSB as long as the SSB resource is associated with at least one of trigger state selected by a MAC-CE. One selected trigger state corresponds to one codepoint of CSI request field of a DCI. In this case, even if the number F of trigger states configured by RRC is smaller than or equal to $2^{N_{TS}}-1$, the MAC-CE selecting trigger states for measurement also is needed. $N_{TS}$ is the number of bits of the CSI request field. For example, the gNB configures UE with F trigger states by RRC signaling. If at least one of the F trigger states is associated with an SSB resource set of the type, or an SSB resource of the type, regardless of the relationship between the F and the $2^{N_{TS}}-1$, the gNB selects L trigger states using a MAC-CE. The L trigger states can be mapped to L codepoints of CSI request fields starting from a codepoint with index 1. The number of codepoints is $2^{N_{TS}}-1$, $N_{TS}$ is the number of bits in the CSI request field. In some implementations, when all the bits of the CSI request field in the DCI are set to zero, no CSI is requested. The UE measures the SSB resource only if it is associated with at least one of trigger state of the L selected trigger states. In some implementations, The UE does not measure the SSB resource if it is not associated with any trigger state of the L selected trigger states and it is only associated with a trigger state of the F trigger states configured by the RRC signaling. If none of the F trigger state is associated with an SSB resource set of the type, or an SSB resource of the type, the MAC-CE selects the L trigger states only when the F is larger than $2^{N_{TS}}-1$. If none of the F trigger state is associated with an SSB resource set of the type, or an SSB resource of the type and the F is smaller than or equal to the $2^{N_{TS}}-1$, the F trigger states are directly in order mapped to the $2^{N_{TS}}-1$ codepoints.

If at least one of the F trigger state is associated with an SSB resource set of the type, or an SSB resource of the type, the MAC-CE selects L trigger states from the F trigger states regardless the relationship between the F and the $2^{N_{TS}}$–1.

In some implementation, when F is larger than $2^{N_{TS}}$–1 and a first condition is satisfied, the MAC-CE selects L trigger states from the F trigger states. If the F is smaller than or equal to the $2^{N_{TS}}$–1 and a first condition is satisfied, the F trigger states are directly in order mapped to the F code-points starting from codepoint 1 without the MAC-CE to select the L trigger state. In some implementations, the first condition includes at least one of: None of the F trigger state is associated with an SSB set of a type; a first mode is enabled; a serving cell is configured with only one pieces of SSB information; or none of neighboring cell is configured; no dedicated pieces of SSB information is configured; no dedicated pieces of SSB information is configured for a serving cell; only Cell specific pieces of SSB information is configured; only Cell specific pieces of SSB information is configured for a serving cell. For example the piece of SSB information is configured in serving cell common signaling. Optionally, the serving cell is associated with an resource setting including the SSB resource set.

In some implementation, the MAC-CE selects the L trigger states from the F trigger states when a second condition is satisfied regardless of whether F is larger than $2^{N_{TS}}$–1. The second condition includes at least one of: at least one of the F trigger state is associated with an SSB resource set of the type/an SSB resource of the type; a second mode is enable; a serving cell is configured with more than one pieces of SSB information; at least one of neighboring cell is configured; at least one dedicated piece of SSB information is configured; or at least one dedicated piece of SSB information is configured for a serving cell. For example the piece of SSB information is configured in serving cell dedicated signaling instead of serving cell common signaling. Optionally, the serving cell is associated with an resource setting including the SSB set.

That at least one of a neighboring cell is configured represents that at least one of neighboring cell is configured for at least one of serving cell, or for the serving cell of the F trigger states. The F trigger states are associated with the serving cell which is configured with the only one pieces of SSB information.

The periodicity of the SSB can be indicated using at least one of RRC, and MAC-CE. Optionally, the SSB is a SSB of neighboring cell SSB. In some implementations, the PCI of the SSB is not a PCI of a serving cell. In some implementations, the PCI of a serving cell is not configured in common signaling of the serving cell.

In some implementation, the maximum number of SSB/CSI-RS (1Tx) resources across all CCs and/or pieces of SSB information configured to measure L1-RSRP within a slot shall not exceed a first threshold which can be a UE capability reported by the UE. In some implementation, the maximum number of SSB resources across all CCs and/or pieces of SSB information configured to measure L1-RSRP shall not exceed a second threshold. In some implementation, the maximum number of SSB resources across all CCs and/or pieces of SSB information to measure L1-RSRP within a slot shall not exceed a third threshold. In some implementations, the second threshold and the third threshold are UE capability which can be reported by the UE. In some implementations, the aperiodic SSB of a neighboring cell only is taken into the number after it is activated by the MAC-CE. If the SSB resource of neighboring cell only is configured by a RRC signaling, it will not be taken into the number. The resource type of a SSB of a neighboring cell can be configured in a resource setting including the SSB. Alternatively the aperiodic SSB of a neighboring cell only is taken into the number for a predefined time length after it is indicated by a DCI.

FIG. 6 illustrates a first example method of reference signaling design and configuration by a wireless communication device, in accordance with present implementations. In some implementations, at least one of the example systems 100 and 200 and the UE 104 and 204 performs method 600 according to present implementations. In some implementations, the method 600 begins at step 610.

At step 610, the example system selects one or more resources. In some implementations, step 610 includes at least one of steps 612 and 614. At step 612, the example system selects N resources, where N is greater than or equal to 1. At step 614, the example system selects one or more resources from multiple reference signal resources/subset/set/setting of reference signal resource set. The method 600 then continues to step 620.

At step 620, the example system sends at least one message with a CSI report to a wireless node. In some implementations, step 620 includes at least one of steps 622, 624, 626 and 628. At step 622, the CSI report includes an index of and quality information for each resource.

At step 624, each resource includes a reference signal resource. At step 626, each resource corresponds to one of M elements, where M is less than or equal to N. At step 628, the quality information is determined based on transmitting power of a resource of the selected resources.

The method 600 then continues to step 702.

FIG. 7 illustrates an example method of reference signaling design and configuration by a wireless communication device further to the example method of FIG. 6. In some implementations, at least one of the example systems 100 and 200 and the UE 104 and 204 performs method 700 according to present implementations. In some implementations, the method 700 begins at step 702. The method 700 then continues to step 710.

At step 710, the example system receives signaling. In some implementations, step 710 includes at least one of steps 712, 714, 716 and 718. At step 712, the signaling indicates whether to determine quality information of each selected resource based on transmitting power. At step 714, the signaling activates or deactivates an SSB resource set. At step 716, the signaling selects L of F trigger states configured by RRC signaling, where L is less than or equal to F. At step 718, the signaling determines a number. The method 700 then continues to step 720.

At step 720, the example system determines a maximum number of elements for selected resources in a CSI report. The method 700 then continues to step 730.

At step 730, the example system determines a maximum number of selected resources in a CSI report. The method 700 then continues to step 740.

At step 740, the example system determines a number of selected resources for one of M elements, where M is s number of elements. The method 700 then continues to step 750.

At step 750, the example system determines a maximum number of selected resources for one of M elements in a CSI report, where M is a number of elements. In some implementations, the method 700 ends at step 750.

Figure 8:
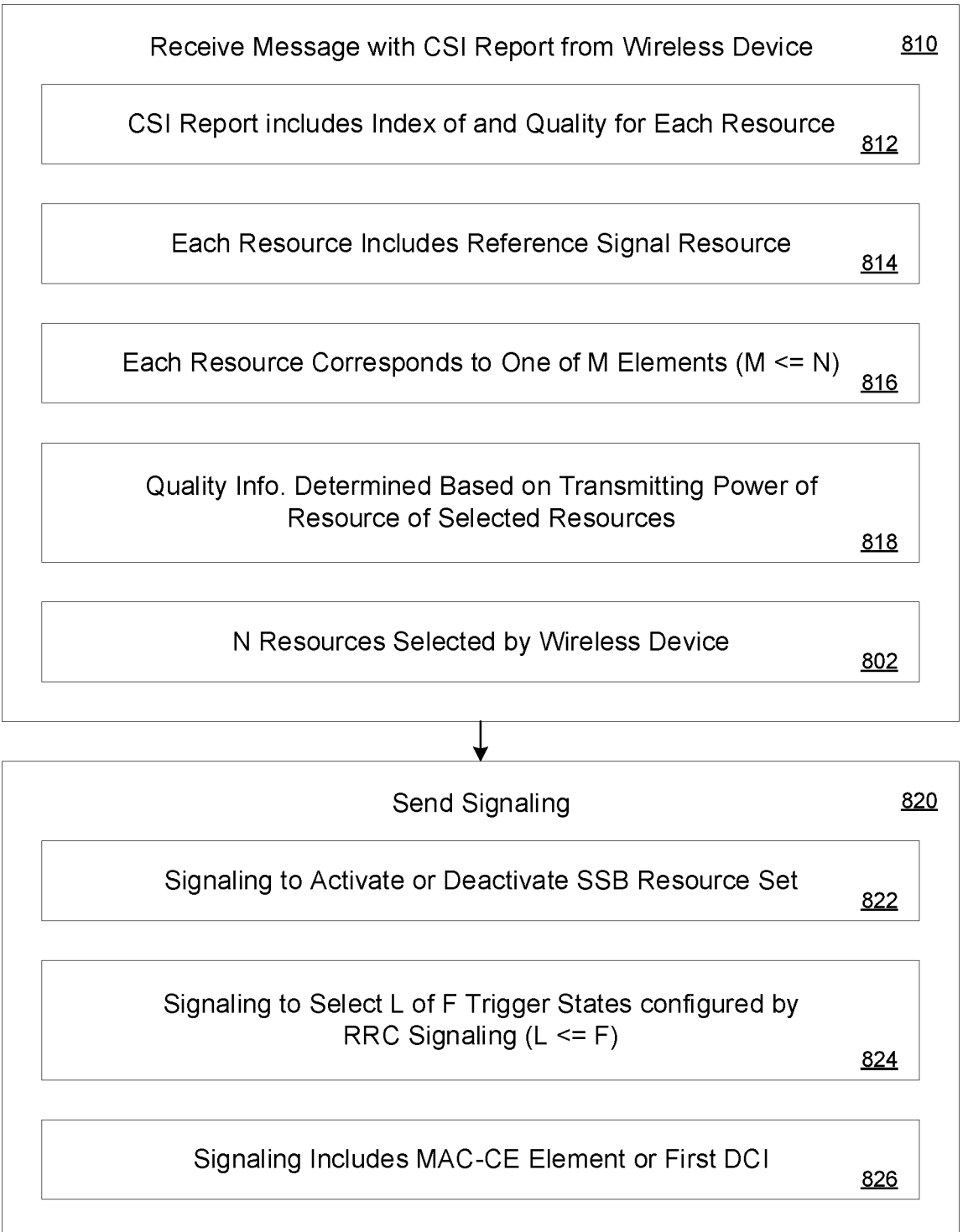
FIG. 8 illustrates a first example method of reference signaling design and configuration by a wireless communication node, in accordance with present implementations.

FIG. 8 illustrates a first example method of reference signaling design and configuration by a wireless communication node, in accordance with present implementations. In some implementations, at least one of the example systems 100 and 200 and the BS 102 and 202 performs method 800 according to present implementations. In some implementations, the method 800 begins at step 810.

At step 810, the example system receives at least one message with a CSI report from a wireless device. In some implementations, step 810 includes at least one of steps 822, 824, 826, 828 and 802. At step 812, the CSI report includes an index of and quality information for each resource. At step 814, each resource includes a reference signal resource. At step 816, each resource corresponds to one of M elements, where M is less than or equal to N. At step 818, the quality information is determined based on transmitting power of a resource of the selected resources. At step 802, the N resources are selected by a wireless device. The method 800 then continues to step 820.

At step 820, the example system sends signaling. In some implementations, step 820 includes at least one of steps 822, 824 and 826. At step 822, the signaling activates or deactivates an SSB resource set. At step 824, the signaling selects L of F trigger states configured by RRC signaling, where L is less than or equal to F. At step 826, the signaling includes a MAC-CE element or a first DCI. In some implementations, the method 800 ends at step 820.

Figure 9:
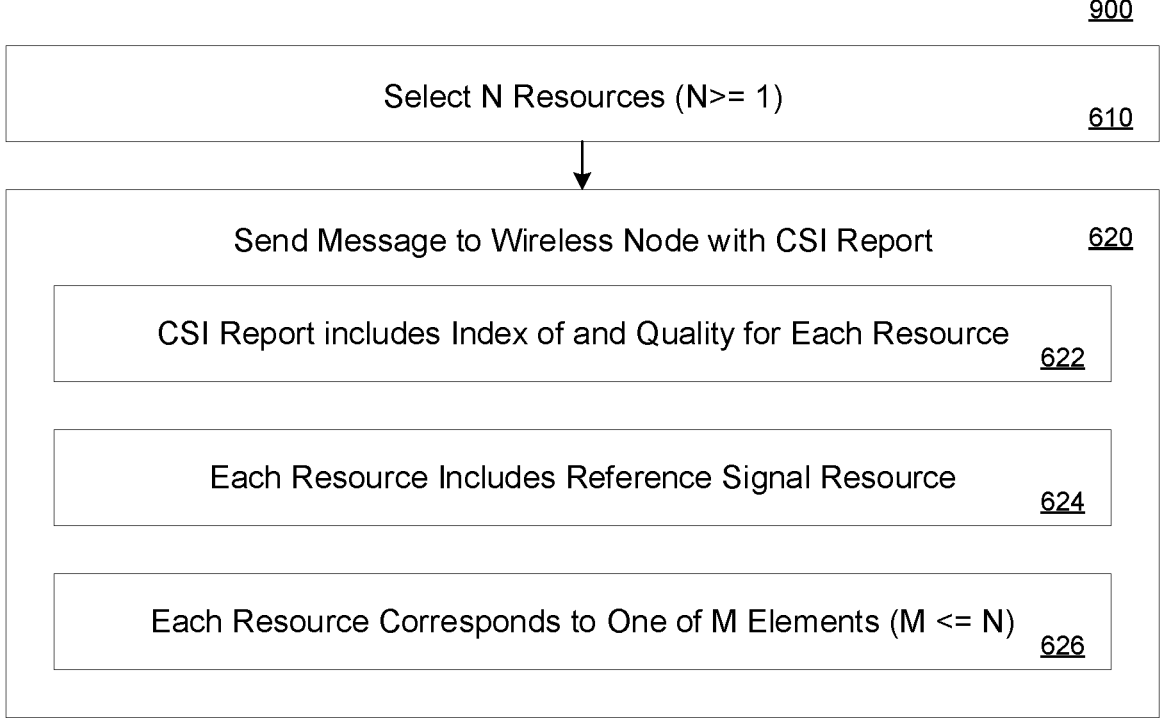
FIG. 9 illustrates a second example method of reference signaling design and configuration by a wireless communication device, in accordance with present implementations.

FIG. 9 illustrates a second example method of reference signaling design and configuration by a wireless communication device, in accordance with present implementations. In some implementations, at least one of the example systems 100 and 200 and the UE 104 and 204 performs method 900 according to present implementations. In some implementations, the method 900 begins at step 610.

At step 610, the example system selects one or more resources. The method 900 then continues to step 620.

At step 620, the example system sends at least one message with a CSI report to a wireless node. In some implementations, step 620 includes at least one of steps 622, 624, 626 and 628. At step 622, the CSI report includes an index of and quality information for each resource. At step 624, each resource includes a reference signal resource. At step 626, each resource corresponds to one of M elements, where M is less than or equal to N. At step 628, the quality information is determined based on transmitting power of a resource of the selected resources. In some implementations, the method 900 ends at step 620.

FIG. 10 illustrates a second example method of reference signaling design and configuration by a wireless communication node, in accordance with present implementations. In some implementations, at least one of the example systems 100 and 200 and the BS 102 and 202 performs method 1000 according to present implementations. In some implementations, the method 1000 begins at step 810.

At step 810, the example system receives at least one message with a CSI report from a wireless device. In some implementations, step 810 includes at least one of steps 822, 824, 826, 828 and 802. At step 812, the CSI report includes an index of and quality information for each resource. At step 814, each resource includes a reference signal resource. At step 816, each resource corresponds to one of M elements, where M is less than or equal to N. At step 818, the quality information is determined based on transmitting power of a resource of the selected resources. At step 802, the N resources are selected by a wireless device. In some implementations, the method 1000 ends at step 810.

FIG. 11 illustrates a third example method of reference signaling design and configuration by a wireless communication node, in accordance with present implementations. In some implementations, at least one of the example systems 100 and 200 and the BS 102 and 202 performs method 1100 according to present implementations. In some implementations, the method 1100 begins at step 820.

At step 820, the example system sends signaling. In some implementations, step 820 includes at least one of steps 822, 824 and 826. At step 822, the signaling activates or deactivates an SSB resource set. At step 824, the signaling selects L trigger states from F trigger states configured by RRC signaling, where L is less than or equal to F. At step 826, the signaling includes a MAC-CE element or a first DCI. In some implementations, the method 1100 ends at step 820.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

The invention claimed is:

1. A wireless communication method, comprising:
   receiving, by a wireless communication device from a wireless communication node, a first signaling that activates or deactivates a synchronization signal block (SSB) resource set,
   wherein the signaling includes a Medium Access Control-Control Element (MAC-CE);
   wherein the MAC-CE selects L trigger states from F trigger states configured by radio resource control (RRC) signaling, wherein L is smaller than or equal to F, wherein at least one of the L trigger states is associated with the SSB resource set; and
   wherein the MAC-CE selects the L trigger states from the F trigger states when a second condition is satisfied, wherein the second condition includes at least one of:

at least one of the F trigger states is associated with a SSB set of a type;
   a second mode is enabled;
   a serving cell is configured with more than one piece of SSB information, wherein each of the more than one piece of SSB information includes at least one of SSB block selection in one SSB burst, time domain pattern case information of an SSB and a periodicity parameter of the SSB; or
   at least one dedicated piece of SSB information is configured for a serving cell, wherein each of the at least one dedicated piece of SSB information includes: SSB block selection in one SSB burst and a periodicity.

2. The method of claim 1, further comprising at least one of:
   measuring, by the wireless communication device, SSB resources in the SSB resource set if the SSB resource set is activated;
   calculating, by the wireless communication device, a number of SSB resources to measure a reference signal received power (RSRP) or signal to interference and noise ratio (SINR) according to the SSB resource set if the SSB resource set is activated;
   not measuring, by the wireless communication device, SSB resources in the SSB resource set in case that the SSB resource set is not activated and it is configured by the RRC signaling; or not measuring, by the wireless communication device, SSB resources in the SSB resource set that is deactivated.

3. The method of claim 1, further comprising at least one of:
   measuring, by the wireless communication device, an SSB resource in the SSB resource set during a predefined number of transmission occasions of the SSB resource after the SSB resource set is activated; or
   measuring, by the wireless communication device, an SSB resource in the SSB resource set during a predefined number of transmission occasions of the SSB resource after a downlink control information (DCI) which includes a codepoint mapped to a trigger state associated with the SSB resource set.

4. The method of claim 1, wherein a subheader of the MAC-CE is the same as a subheader of a MAC-CE that activates or deactivates a Channel State Information-Reference Signal (CSI-RS) resource set.

5. The method of claim 1, wherein the MAC-CE includes information for indicating a type of set that the MAC-CE activates or deactivates, wherein the type of set includes a Channel State Information-Reference Signal (CSI-RS) resource set and the SSB resource set.

6. The method of claim 5, wherein the MAC-CE includes a transmission configuration indication (TCI) state for each CSI-RS resource in the CSI-RS resource set, when the MAC-CE activates the CSI-RS resource set.

7. The method of claim 1, wherein if the signaling activates the SSB resource set, the MAC-CE includes one piece of SSB information for each SSB resource in the SSB resource set, or the MAC-CE includes one piece of SSB information for the SSB resource set,
   wherein the one piece of SSB information includes at least one of: a physical cell identifier (PCI), frequency information of the SSB, a SSB block selection in one SSB burst, a transmitting power, a half frame index of the SSB, or a periodicity.

8. The method of claim 1, wherein the signaling selects the L trigger states from the F trigger states when the F is larger than $2^{N_{TS}}-1$ and a first condition is satisfied, wherein $N_{TS}$ is a number of bits in an CSI request field in a downlink control information (DCI), wherein the first condition includes at least one of:

none of the F trigger states is associated with an SSB set of a type;
a first mode is enabled;
  a serving cell is configured with only one piece of SSB information;
none of neighboring cells is configured;
  no dedicated piece of SSB information is configured;
  no dedicated piece of SSB information is configured for a serving cell;
  only a cell specific piece of SSB information is configured; or
  only the cell specific piece of SSB information is configured for a serving cell.

9. The method of claim 1,
  wherein each of the at least one dedicated piece of SSB information further includes at least one of frequency information of the SSB, a transmitting power, or a half frame index of the SSB.

10. The method of claim 1, wherein the signaling selects the L trigger states from the F trigger states regardless of a relationship between the F and $2^{N_{TS}}-1$ wherein $N_{TS}$ is a number of bits in an CSI request field in a downlink control information (DCI).

11. The method of claim 1, further comprising at least one of:
  receiving a RRC signaling which includes a resource type of an SSB resource, wherein the resource type is one of aperiodic, semi-persistent, or periodic;
  receiving a RRC signaling which indicates whether an SSB resource set can be activated or deactivated by the signaling;
  receiving a RRC signaling which indicates whether each SSB resource of an SSB resource set can be associated with one piece of SSB information in a trigger state or in the signaling;
  receiving a RRC signaling which indicates whether an SSB resource set can be associated with one piece of SSB information in a trigger state or in the signaling;
  receiving a RRC signaling which indicates whether each SSB resource of an SSB resource set can be associated with one dedicated piece of SSB information in a trigger state or in the signaling, wherein the one dedicated piece of SSB information includes at least one of: a physical cell identifier (PCI), frequency information of the SSB, a SSB block selection in one SSB burst, a transmitting power, a half frame index of the SSB, or a periodicity; or
  receiving a RRC signaling which indicates whether an SSB resource set can be associated with one dedicated piece of SSB information in a trigger state or in the signaling.

12. The method of claim 1, wherein the L selected trigger states are mapped in order to L codepoints of CSI request field of a downlink control information (DCI) starting from codepoint 1, and wherein the F trigger states are associated with one serving cell or one bandwidth part (BWP).

13. The method of claim 1, wherein an SSB resource in the SSB resource set is associated with one of a physical cell identifier (PCI) of a neighboring cell, or one dedicated piece of SSB information, wherein the one dedicated piece of SSB information includes at least one of: a physical cell identifier (PCI), frequency information of the SSB, a SSB block selection in one SSB burst, a transmitting power, a half frame index of the SSB, or a periodicity.

14. The method of claim 1, further comprising at least one of:
  configuring an SSB resource of a serving cell only to be periodic;
  configuring an SSB resource of a neighboring cell as being one of: aperiodic, semi-persistent, or periodic;
  configuring an SSB resource associated with a cell specific piece of SSB information only to be periodic; or
  configuring an SSB resource associated with a dedicated piece of SSB as being one of: aperiodic, semi-persistent, or periodic.

15. The method of claim 1, wherein the SSB resource set is associated with a periodicity and without periodic offset.

16. A wireless communication method, comprising:
  sending, by a wireless communication node to a wireless communication device, a signaling that activates or deactivates a synchronization signal block (SSB) resource set,
  wherein the signaling includes a Medium Access Control-Control Element (MAC-CE);
  wherein the MAC-CE selects L trigger states from F trigger states configured by radio resource control (RRC) signaling, wherein L is smaller than or equal to F, wherein at least one of the L trigger states is associated with the SSB resource set; and
  wherein the MAC-CE selects the L trigger states from the F trigger states when a second condition is satisfied, wherein the second condition includes at least one of:
  at least one of the F trigger states is associated with a SSB set of a type;
  a second mode is enabled;
  a serving cell is configured with more than one piece of SSB information, wherein each of the more than one piece of SSB information includes at least one of SSB block selection in one SSB burst, time domain pattern case information of an SSB and a periodicity parameter of the SSB; or
  at least one dedicated piece of SSB information is configured for a serving cell, wherein each of the at least one dedicated piece of SSB information includes: SSB block selection in one SSB burst and a periodicity.

17. A wireless communication device, comprising:
  at least one processor configured to:
  receive, via a receiver from a wireless communication node, a signaling that activates or deactivates a synchronization signal block (SSB) resource set,
  wherein the signaling includes a Medium Access Control-Control Element (MAC-CE);
  wherein the MAC-CE selects L trigger states from F trigger states configured by radio resource control (RRC) signaling, wherein L is smaller than or equal to F, wherein at least one of the L trigger states is associated with the SSB resource set; and
  wherein the MAC-CE selects the L trigger states from the F trigger states when a second condition is satisfied, wherein the second condition includes at least one of:
  at least one of the F trigger states is associated with a SSB set of a type;
  a second mode is enabled;
  a serving cell is configured with more than one piece of SSB information, wherein each of the more than one piece of SSB information includes at least one of SSB block selection in one SSB burst, time domain pattern case information of an SSB and a periodicity parameter of the SSB; or at least one dedicated piece of SSB information is configured for a serving cell, wherein each of the at least one dedicated piece of SSB information includes: SSB block selection in one SSB burst and a periodicity.

18. A wireless communication node, comprising:

at least one processor configured to:

send, via a transmitter to a wireless communication device, a signaling that activates or deactivates a synchronization signal block (SSB) resource set, wherein the signaling includes a Medium Access Control-Control Element (MAC-CE);

wherein the MAC-CE selects L trigger states from F trigger states configured by radio resource control (RRC) signaling, wherein L is smaller than or equal to F, wherein at least one of the L trigger states is associated with the SSB resource set; and wherein the MAC-CE selects the L trigger states from the F trigger states when a second condition is satisfied, wherein the second condition includes at least one of:

at least one of the F trigger states is associated with a SSB set of a type;

a second mode is enabled;

a serving cell is configured with more than one piece of SSB information, wherein each of the more than one piece of SSB information includes at least one of SSB block selection in one SSB burst, time domain pattern case information of an SSB and a periodicity parameter of the SSB; or at least one dedicated piece of SSB information is configured for a serving cell, wherein each of the at least one dedicated piece of SSB information includes: SSB block selection in one SSB burst and a periodicity.

19. The wireless communication node of claim 18, wherein an SSB resource in the SSB resource set is associated with one of a physical cell identifier (PCI) of a neighboring cell, or one dedicated piece of SSB information, wherein the one dedicated piece of SSB information includes at least one of: a physical cell identifier (PCI), frequency information of the SSB, a SSB block selection in one SSB burst, a transmitting power, a half frame index of the SSB, or a periodicity.

* * * * *